F. G. WAGNER.
ATTACHMENT FOR DENTAL ENGINES.
APPLICATION FILED APR. 15, 1918.

1,293,998.

Patented Feb. 11, 1919.

Inventor
Frank G. Wagner his Attorney.

UNITED STATES PATENT OFFICE.

FRANK G. WAGNER, OF LOS ANGELES, CALIFORNIA.

ATTACHMENT FOR DENTAL ENGINES.

1,293,998.      Specification of Letters Patent.      Patented Feb. 11, 1919.

Application filed April 15, 1918. Serial No. 228,723.

*To all whom it may concern:*

Be it known that I, FRANK G. WAGNER, a citizen of the United States, residing at Los Angeles, in the county of Los Angeles, State of California, have invented new and useful Improvements in Attachments for Dental Engines, of which the following is a specification.

This invention relates to devices for use in dentistry, and particularly for devices adapted to be used especially in connection with dental engines for the purpose of supplying water thereto. It will also be obvious that my device may be used independently for the purpose of supplying water or other fluid, such as air, to the patient's mouth. But I shall describe a preferred form of my invention used as an attachment to a dental engine.

The invention will be best understood from the following detailed description of a preferred form thereof, reference being had for this purpose to the accompanying drawings in which—

Figure 1:
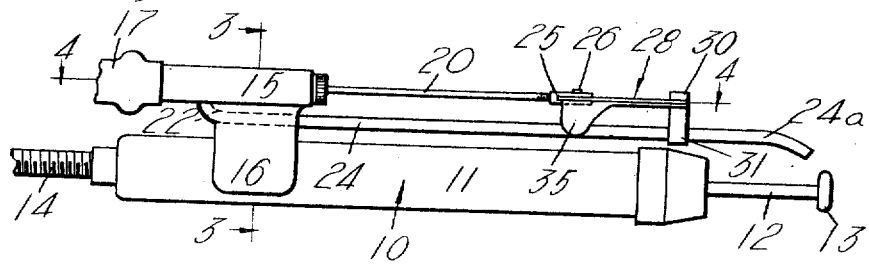
Figure 2:
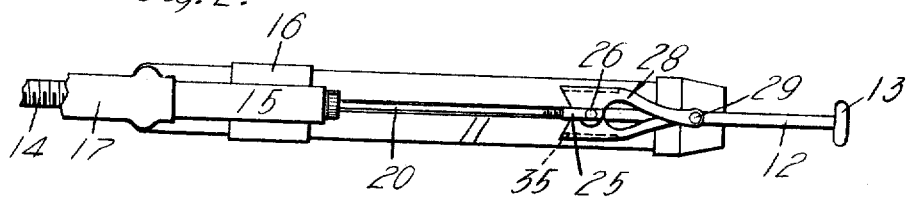
Figure 4:
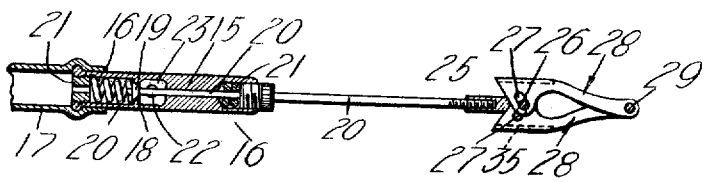
Figure 3:
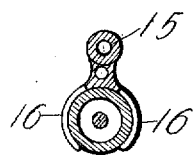
Figure 3:
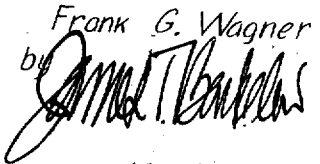

Figure 1 is a side elevation showing my device as it appears on a dental engine; Fig. 2 is a plan thereof; Fig. 3 is a cross section taken on line 3—3 of Fig. 1; and Fig. 4 is an enlarged section taken on line 4—4 of Fig. 1.

In the drawings the numeral 10 designates a dental engine of any usual character. Such a dental engine usually has a handle portion 11 which carries a spindle 12 carrying the grinding or cleaning tool or the like 13 on its end. This spindle is usually driven by a flexible shafting 14. When my device is attached to such a dental engine it is used primarily for the purpose of supplying water to the tools 13. My device embodies a small cylindrical part 15 provided with spring clips 16 adapted to fit around the handle 11 of the dental engine and hold my device in proper position thereon. These spring clips may be made of suitable size to encompass the handle 11. The cylindrical part 15 has a longitudinal chamber 16 at its rear end into which the water is delivered by a flexible tubing 17. At the forward end of this cylindrical chamber 16 there is a valve seat 18 upon which a valve 19 is seated by a small spring 20; and the rear end of this spring 20 is confined by a hollow plug 21. This spring is strong enough to keep the valve 19 securely seated; but only a small amount of spring pressure is necessary for this purpose. Valve 19 is mounted on valve stem 20 which projects out of the forward end of the cylindrical member 15, a suitable packing gland being provided at 21 to prevent leakage. The outlet for fluid is at 22 from a chamber 23 ahead of valve 19; and fluid may be admitted to this outlet 22 by rearward movement of valve 19 off its seat. From the outlet 22 a small discharge tube 24 extends forwardly, and its forward end is curved at 24ª to bring the water discharge close to the tool 13. Upon this tube 24 I mount the manually operatable devices which cause the movement of valve stem 20. Valve stem 20 at its forward end is screw-threaded into the rear end of a yoke 25 whose bifurcated forward end carries a pin 26. Pin 26 extends through two diagonal slots 27 in two members 28 which are pivoted at 29 on a pin 30 mounted on a lug or boss 31 which in turn is mounted upon the tube 24. The two opposite outer sides of members 28 have extending thumb or finger pieces 35. The position of slot 27 is such that when the members 28 are squeezed slightly together, the valve stem is moved rearwardly lifting the valve 19 off its seat and allowing a flow of fluid through the discharge tube 24. Only a slight amount of pressure on members 28 is necessary. The members 28 are in such a position as to be very convenient to the thumb and forefinger of the hand which holds the dental engine.

My whole device is very simple in construction and has an easy and natural operation. It is small and does not interfere with the proper manipulation of dental engine to which it is attached. By my device the delivery of fluid to the tool 13 is always under the immediate and easy control of the operator.

It will of course be understood that my invention is not limited to use in connection with dental engines; as the device may also be used for delivering fluid to the mouth of a patient, for the purpose of washing out cuttings or grindings; or for any other use of like character to which it may be put. And it will be further understood that although I have described a specific form of device embodying my invention, I do not thereby limit my invention to this specific and particular form of device, reserving to myself all such changes and modifications as may occur to those skilled in the art, or as may come within the scope of the following claims.

Having described a preferred form of my invention, I claim:

1. In a device of the character described, a member having a fluid passage, a longitudinally movable valve controlling said fluid passage, and means for manually moving said valve, said means embodying a pair of members movable oppositely and each laterally with relation to said fluid passage member and adapted to be moved together by the hand to open the valve.

2. In a device of the character described, a member having a fluid passage, a longitudinally movable valve controlling said fluid passage, and means for manually moving said valve, said means embodying a pair of oppositely and laterally movable members adapted to be moved together by the hand to open the valve, said members having each a diagonal slot, a pin engaging in both slots, and connecting means between the pin and the valve.

3. In a device of the character described, a member having a fluid passage therethrough, and having a fluid inlet and a fluid outlet and having a valve seat in the said passage between the inlet and the outlet, a valve seated upon said valve seat, a spring holding said valve in its seated position, a valve stem extending longitudinally out of said member, an outlet tube connected with the outlet of said member and extending longitudinally from said member parallel with the valve stem, a pivot mounted upon said outlet tube, a pair of manually movable members mounted upon said pivot and movable laterally inwardly toward each other, each of said laterally movable members having a diagonal slot, and a pin on the forward end of said valve stem engaging in the slots of both said members.

4. In a device of the character described, a chambered member having a fluid inlet and a fluid outlet, a longitudinally movable valve in said chamber controlling communication between the inlet and outlet thereof, and a transversely movable member adapted to be moved manually and adapted by transverse movement to cause longitudinal movement of the valve.

In witness that I claim the foregoing I have hereunto subscribed my name this 8th day of April 1918.

FRANK G. WAGNER.

Witnesses:
VIRGINIA I. BERINGER,
VIRGINIA R. OLMSTED.

Copies of this patent may be obtained for five cents each, by addressing the "Commissioner of Patents, Washington, D. C."